(12) United States Patent
Schäfer (10) Patent No.: US 8,172,071 B2
(45) Date of Patent: May 8, 2012

(54) TILTING AND ROTATING STATION FOR USE IN AN AUTOMATED ORDER-PICKING SYSTEM

(75) Inventor: Gerhard Schäfer, Neunkirchen (DE)

(73) Assignee: SSI Schafer Noell GmbH Lager-und Systemtechnik, Giebelstadt (DE)

( * ) Notice: Subject to any disclaimer, the term of this patent is extended or adjusted under 35 U.S.C. 154(b) by 0 days.

(21) Appl. No.: 12/559,452

(22) Filed: Sep. 14, 2009

(65) Prior Publication Data

US 2011/0005897 A1    Jan. 13, 2011

Related U.S. Application Data

(63) Continuation of application No. PCT/EP2008/004756, filed on Jun. 13, 2008.

(30) Foreign Application Priority Data

Jun. 13, 2007    (DE) .......................... 10 2007 027 864

(51) Int. Cl.
B65G 47/24    (2006.01)
B65B 35/16    (2006.01)
(52) U.S. Cl. ...................... 198/414; 198/412; 198/413
(58) Field of Classification Search .................. 198/394, 198/397.06, 401, 407, 408, 412, 413, 414; 414/758, 772, 774; 700/229
See application file for complete search history.

(56) References Cited

U.S. PATENT DOCUMENTS

| | | | | |
|---|---|---|---|---|
| 2,069,880 A | * | 2/1937 | Gelbman et al. .............. | 414/754 |
| 3,468,998 A | * | 9/1969 | Lingl ............................ | 264/148 |
| 3,901,166 A | * | 8/1975 | Morandi et al. ............... | 198/411 |
| 4,214,655 A | * | 7/1980 | Bernham et al. ............... | 198/374 |
| 4,462,746 A | * | 7/1984 | Smets ......................... | 414/795.4 |
| 4,613,268 A | * | 9/1986 | Capdeboscq et al. .......... | 414/796 |
| 5,006,040 A | * | 4/1991 | Frey ............................. | 414/789.9 |
| 5,141,095 A | * | 8/1992 | Kamp ............................ | 198/409 |
| 5,160,013 A | * | 11/1992 | McDowell .................... | 198/412 |
| 5,370,216 A | * | 12/1994 | Tsuruyama et al. .......... | 198/395 |

(Continued)

FOREIGN PATENT DOCUMENTS

DE      1 243 572 B     6/1967

(Continued)

*Primary Examiner* — Douglas Hess
(74) *Attorney, Agent, or Firm* — McNeely, Hare & War, LLP; Kevin J. McNeely (57) ABSTRACT

A system (10) and method for packing an article (20) onto a shipping carrier (26), the article (20) having an arbitrary orientation relative to the conveyor (28) and being transported within an order-picking system on a conveyor (28; 28a, 28b) downstream towards a packing station (22), which includes a packing robot (12) for automatically loading the shipping carrier (26), wherein the article (20) is to be put down with one of its faces (38) onto the shipping carrier (26). The one of the faces can be predetermined arbitrarily, comprising: a rotating station (30), preferably provided in the conveyor (28), and thus dividing the conveyor (28), having a rotation area (42), which is substantially arranged in a plane of the conveyor (28) for receiving an article (20) from the conveyor (28), and which is rotatable from a receiving position about an axis perpendicular to the plane of the conveyor (28) into a plurality of delivery positions; and a tilting station (32) comprising a tilt area (46), wherein the tilt area (46) in a receiving position is substantially orientated parallel with respect to the plane of the conveyor (28), and in a tilting position is substantially orientated perpendicular to the plane of the conveyor (28).

20 Claims, 6 Drawing Sheets

U.S. PATENT DOCUMENTS

| | | |
|---|---|---|
| 5,392,927 A | 2/1995 | Haverkamp Begemann et al. |
| 5,417,562 A | 5/1995 | Simon |
| 5,450,940 A * | 9/1995 | Rathert et al. ............... 198/412 |
| 5,788,460 A * | 8/1998 | Campau .................... 414/791.6 |
| 6,015,039 A * | 1/2000 | Bonnet ........................ 198/368 |
| 6,419,074 B1 * | 7/2002 | Rasile et al. .................. 198/399 |
| 6,527,502 B2 * | 3/2003 | Leijenaar ..................... 414/792 |
| 7,047,710 B2 | 5/2006 | Winkler |
| 7,341,421 B2 * | 3/2008 | Kyrstein ...................... 414/763 |
| 7,347,312 B2 * | 3/2008 | Han et al. ................... 198/346.2 |
| 7,389,867 B2 * | 6/2008 | Hillmantel et al. ........... 198/395 |
| 7,967,543 B2 * | 6/2011 | Criswell et al. .............. 414/373 |

FOREIGN PATENT DOCUMENTS

| | | |
|---|---|---|
| DE | 29 49 627 A1 | 7/1980 |
| DE | 35 23 288 A1 | 1/1987 |
| DE | 40 37 593 C1 | 1/1992 |
| DE | 692 02 141 T2 | 8/1995 |
| DE | 103 13 576 A1 | 10/2004 |
| DE | 103 13 576 B4 | 10/2004 |
| DE | 10 2004 012 043 A1 | 9/2005 |
| EP | 0 615 929 A | 9/1994 |
| EP | 0 827 820 A1 | 3/1998 |
| JP | 58 139926 A | 8/1983 |

* cited by examiner

TILTING AND ROTATING STATION FOR USE IN AN AUTOMATED ORDER-PICKING SYSTEM

CROSS-REFERENCE TO RELATED APPLICATIONS

This is a continuation application of the co-pending international patent application WO 2008/151812/PCT/EP2008/004756) filed on 13 Jun. 2008, which claims the priority of the German patent application DE 10 2007 027 864 filed on 13 Jun. 2007, which are incorporated by reference herewith.

BACKGROUND OF THE INVENTION

The present invention relates to an automated system for packing an article on a shipping carrier, wherein the article is transported inside an order-picking system on a conveyor, having an arbitrary orientation with respect to the conveyor, downstream towards a packing station, which comprises a packing robot for loading the shipping carrier in an automated manner, wherein the article is to be put-down on the shipping carrier with an arbitrarily selectable side thereof, i.e. normally with its standing face.

The invention further relates to a method for packing an article on a shipping carrier, wherein the article is transported inside an order-picking system on a conveyor, having an arbitrary orientation relative to the conveyor, downstream towards a packing station, which comprises a packing robot for loading the shipping carrier with the article in an automated manner, wherein the article is to be put-down on the shipping carrier with an arbitrarily selectable face of the article.

RELATED PRIOR ART

Manifold systems for packing articles in an automated manner are known, wherein the packing units typically are ashlar-shaped (for example a crate of milk, a beverage box, PET bottles sealed with a PVC foil, etc.). For this purpose, different grab robots have been developed, which can move in a translational manner in all three directions of space, wherein typically a rotational movement around each space axis is possible as well. For this purpose, the grab robots are provided with correspondingly many actuators, all of which have to be controlled by a (superordinated) control device.

Typically, the grab robots "know" the orientation by which an article to be grabbed is presented. If this information is not available, then some grab robots are provided with additional detecting devices, such as an integrated video camera, in order to allow recordation of an image of the presented article, based on which the different movement processes can then be calculated for putting down the article in a desired position or orientation. Of course, this requires a high computing expenditure, and leads to a slow down of the entire process since movement processes to be carried out by the grab robot have to be computed in advance. Thus, the grab robot represents kind of a "bottle neck".

This is particularly noticeable in order-picking systems being operated at high performances, for example at handling rates of 7500 article units an hour. Articles are transported in such high-performance systems via a conveyor from an article warehouse to the grab robot so that this grab robot can load the articles on a shipping carrier such as a Europool pallet.

Also, there are approaches according to which the articles are already transported in a predetermined position towards a loading robot, so that this loading robot merely needs to grab the article for loading same on the shipping carrier. In this context, tilting devices and rotating devices are used, in order to orientate the articles in advance.

The document DE 103 13 576 B4 discloses such system and method. There, articles are delivered in a predetermined position by means of a tilting device and a rotating device until the articles are brought to a loading robot. The loading robot is similar to a cake server, which is driven beneath the article to be loaded, and lifts the article, in order to transport the article towards the shipping carrier, and which pushes the article subsequently from the "cake server", in order to position the article on the shipping carrier. In this connection, the articles are transported on trays to the loading robot. The trays comprise a plurality of holes in their bases so that articles located on the trays can be tilted by lifting pins reaching through the holes (tilting station). The trays are rotated about 90°, 180° or 270° at the rotating device. Further, so-called shaking devices are required for moving the articles into a predetermined corner of the tray. The tilting and rotating actions happen while the article is still located on the tray.

Additional common systems are shown in the documents DE 1 243 572 B, DE 29 49 627 A1, DE 40 37 593 C1, DE 35 23 288 A1, DE 692 02 141 T2 as well as DE 10 2004 012 043 A1.

SUMMARY OF THE INVENTION

It is an object of the present invention to provide an enhanced system and method allowing to load articles on a shipping carrier in an automated manner, wherein the articles are delivered chaotically and have to be put on a predetermined face. Particularly, a boundary condition is pre-given according to which a packing robot itself cannot tilt the articles which are presented thereto.

This object is solved by a system as mentioned at the outset, wherein the system comprises a rotating station and a tilting station, wherein the rotating station is preferably provided in the conveyor, and thus divides the conveyor, wherein the rotating station is provided with a rotation area, which is substantially arranged in a plane of the conveyor for receiving an article from the conveyor, and which is rotatable from a receiving position about an axis perpendicular relative to the plane of the conveyor in a plurality of delivery positions, wherein the tilting station comprises a tilt area, wherein the tilt area is orientated substantially parallel to the plane of the conveyor in a receiving position, and is orientated substantially perpendicular to the conveyor in a tilting position.

Such an arrangement allows presentation of articles to the packing robot in the desired orientation, namely before they reach the packing robot. The articles are transported on the conveyor to the packing robot. At the time when the packing robot receives the presented articles no additional computations need to be conducted in order to determine how the article is to be rotated or moved, in order to allow the article to be put on a desired standing face, i.e. the face on which the article finally stands, when the article is presented to the packing robot for the purpose of being retrieved. The effort associated with the orientation of the article is temporarily before the presentation of the article. It is possible to bring the article in any arbitrary position, so that the packing robot merely needs to retrieve the article and does not need to conduct additional tilting movements.

Further, in this manner the article can be packed in a position-optimized manner, i.e. a presented article can be rotated already in advance so that the article just fits into a "hole" in the stack of articles to be packed on the shipping carrier.

In accordance with a preferred embodiment, the tilt area comprises a tilting axis at an upstream located end of the tilt area, the tilting axis being orientated parallel to a hand-over end of the conveyor located downstream, and particularly couples to the hand-over end.

Thus, it is ensured that articles, which are coming directly from the conveyor, are presented. A handing over to a specific packing robot receiving location is not required. Thus, the article "flows" up to a location where it is presented to the packing robot.

Additionally, it is advantageous if the tilt area comprises a stopper located at a downstream end against which articles abut being handed over to the tilting station from the conveyor, and which is suitable to support the article, being handed over, in the tilting position.

The stopper ensures at any time that the articles are always presented at a constant height. The stopper serves, on the one hand, as a stopper for the articles coming from the conveyor, and, on the other hand, defines a parking area if the tilting station is in its tilting position.

Additionally, it is preferred, if at least the first stopper comprises at least one recess such that a grab device of the packing robot, if the tilting station is in the tilting position, can grab beneath the article handed over, in order to take same by lifting the grab device.

In this case, the grab device meshes, for example, with the stopper. The handing-over of articles happens by a simple lifting process. Provision of soaking devices, as exemplarily provided in the prior art, is not required here. The forces, which need to be applied for holding the articles on or in the grab device, are minimal, since gravity is used for fixing the articles.

Also, it is advantageous if the tilt area comprises at least one recess adapted to the grab device.

In this case, the stopper and the tilt area form a kind of a rake, which can cooperate with a grab device of the packing robot being correspondingly formed in a rake-like shape. Thus, it is ensured that an article being grabbed by the packing robot can be delivered to the tilting station once again for tilting the body one additional time. For this purpose, the tilting station is brought in its receiving position, until the grabbed article is returned to the packing station by the packing robot. Subsequently, the tilting station is moved again to the tilting position so that the article is tilted another time. In this manner, it is possible that articles can be put on a (top) face of the article, which can be seen in the top view of the conveyor, when the articles are transported on the conveyor.

In accordance with another embodiment, the at least one recess meshes with the grab device.

Further, it is preferred if the tilting station comprises a lifting and lowering device, particularly a cylinder being operated electrically or hydraulically.

Then, the tilt area can be reciprocated between the receiving position and the tilting position.

In accordance with another particular embodiment, the tilt area comprises a stopper at its downstream end.

This stopper serves for stopping the articles at a predefined position, particularly if the articles are delivered with a relatively high velocity from the conveyor to the rotating station.

Particularly, the stopper can be lowered relative to the rotation area.

This can be of use if the article, for example, does not need to be rotated. In this case, the stopper can be lowered, and the article is passed without being rotated. If the stopper could not be lowered, the rotating station would need to be rotated from the receiving position thereof into a lateral rotation position, so that the stopper does not block the further transport of the article.

Also, it is advantageous if the rotation area can be lifted and lowered with respect to the plane of the conveyor.

In this manner, the article can already be tilted for the first time.

In accordance with another particular embodiment, the rotating station comprises a conveyor unit for handing over an article being located on the rotation area after a rotation has happened, to a section of the conveyor located downstream, or directly to the tilting station.

Particularly, the system comprises a monitoring device arranged upstream relative to the rotating station.

The position of an article to be packed can be detected by means of this monitoring device, and transmitted to a superordinated control computer, particularly a warehouse management computer. Then, the warehouse management computer computes corresponding rotating and/or tilting processes based on the detected position, in order to present the article on the predefined standing face thereof. The packing robot then grabs the article being orientated in this manner, and puts down same on the shipping carrier.

A packing software calculates (in advance) the ideal and possible standing face, orientation, and position of the article on the shipping carrier. Thus, the articles can be delivered individually, i.e. arbitrarily orientated, and always be moved into the ideal position. The packing software, during the planning of the packing process, is completely free to put the article on any arbitrary face, so that the article fits optimally into the stack of articles being already located on the pallet. This increases the degree of freedom until packing, i.e. during the order-picking process. The volume utilization on the shipping carrier is optimized. An "interlaced" superposition of the articles on the shipping carrier is allowed. Articles tipping over during a transport to the packing station (on the conveyor), or twisting, can be orientated again as desired or planned. If humans are (supportingly) employed during the packing process, the articles can be delivered in an ergonomic manner, i.e. such that a human can better grab the articles.

Further, it is advantageous, if the rotating station and the tilting station are arranged separately from each other.

Here, rotating processes and tilting processes are decoupled. A number of articles can be rotated and tilted simultaneously.

Further, general advantages are to be seen in that unstable articles can be transported in a lying manner until they are packed subsequently. This increases the tilting safety during the transport through the order-picking system. This results in less waste.

The shipping carrier can be superposed. Pressure-stable layers can be formed on the shipping carrier, wherein gaps can particularly be avoided or filled.

The above-mentioned object is additionally solved in accordance with the method as mentioned at the outset, wherein the method comprises the steps of: rotating the article on a rotation area of the rotating station about a rotating axis, which is orientated perpendicular to a plane of the conveyor; tilting on a tilt area the rotated article from a substantially horizontal receiving position about a tilting axis, which lies in the plane of the conveyor, into a substantially vertical tilting position; receiving the tilted article by means the packing robot; and putting down the article with a predefined standing face thereof onto the shipping carrier.

Until the article is handed over to the packing robot, the article is already in its desired orientation, i.e. the article stands on the predetermined standing face. In order to tilt the article, the article is merely to be handed over to the tilting station on a constant level of height. For the purpose of the delivery from the conveyor to the tilting station, the force of the article can be used, which the article still has due to the movement on the conveyor. The gravity is used in order to tilt the article subsequently. The tilt area is preferably lowered from the horizontal into the vertical, whereby no energy is required for this purpose. The tilt area can alternatively be already slightly inclined in the receiving position so that merely little motion energy is required for delivering the article from the conveyor to the tilting station or tilt area.

The rotation of the article particularly occurs upstream with respect to the tilting station. Rotating and tilting movements happen until the article is presented to the packing robot. All computations, which are required for the right orientation of the article, already happen until the article is presented to the packing robot. Preferably, the rotating station and the tilting station are arranged in the direct vicinity of the packing station, so that a flow of articles up to the packing station, which, as a rule, represents the final station of an article until the shipping thereof, remains almost undisturbed.

Further, it is preferred that the step of receiving comprises: grabbing beneath a stopper of the tilt area, the stopper comprising at least one recess, by means of a grab device of the packing robot meshing with the recess; and lifting the grab device for receiving the article and putting down same on the shipping carrier.

As already mentioned above, the gravity is used here for fixing the article on the grab device of the packing robot.

The method particularly comprises the following steps: tilting-back the tilt area into the receiving position; delivering the article from the grab device to the tilted back tilt area; then tilting the tilt area once again; and then receiving the article with the grab device once again.

An additional tilting process can be provided in this manner without having to provide an additional tilting device. This course of action can particularly be used if an article on the conveyor has to be put from its bottom to its top, i.e. rotated about 180° with respect to the original orientation thereof.

Further, it is preferred if the rotation area is lowered with respect to the plane of the conveyor, and then lifted again to the plane of the conveyor.

In this manner, the article can be tilted alternatively another time.

In accordance with another embodiment, the orientation of the article on the conveyor is detected and transmitted to a superordinated control device.

In this manner, it can be determined how the body is to be rotated and tilted, allowing the presentation on the standing face thereof.

Further, it is advantageous if the orientation of the article on the conveyor is detected, and transmitted to a superordinated control device, in order to determine a rotating process, so that the article can be put on the shipping carrier with the pre-given face thereof.

It is clear that the above-mentioned, and still to be explained, features cannot only be used in the respectively given combination, but also in other combinations or alone, without departing from the scope of the present invention.

BRIEF DESCRIPTION OF THE DRAWINGS

Embodiments of the invention are illustrated in the drawings and will be described in more detail in the following description, wherein.

DETAILED DESCRIPTION OF THE INVENTION

In the following description of the figures same elements will be designated with the same reference numerals. If there are deviations of specific features, this will be explicitly explained. A system in accordance with the present invention will hereinafter generally be designated by 10.

Figure 1:
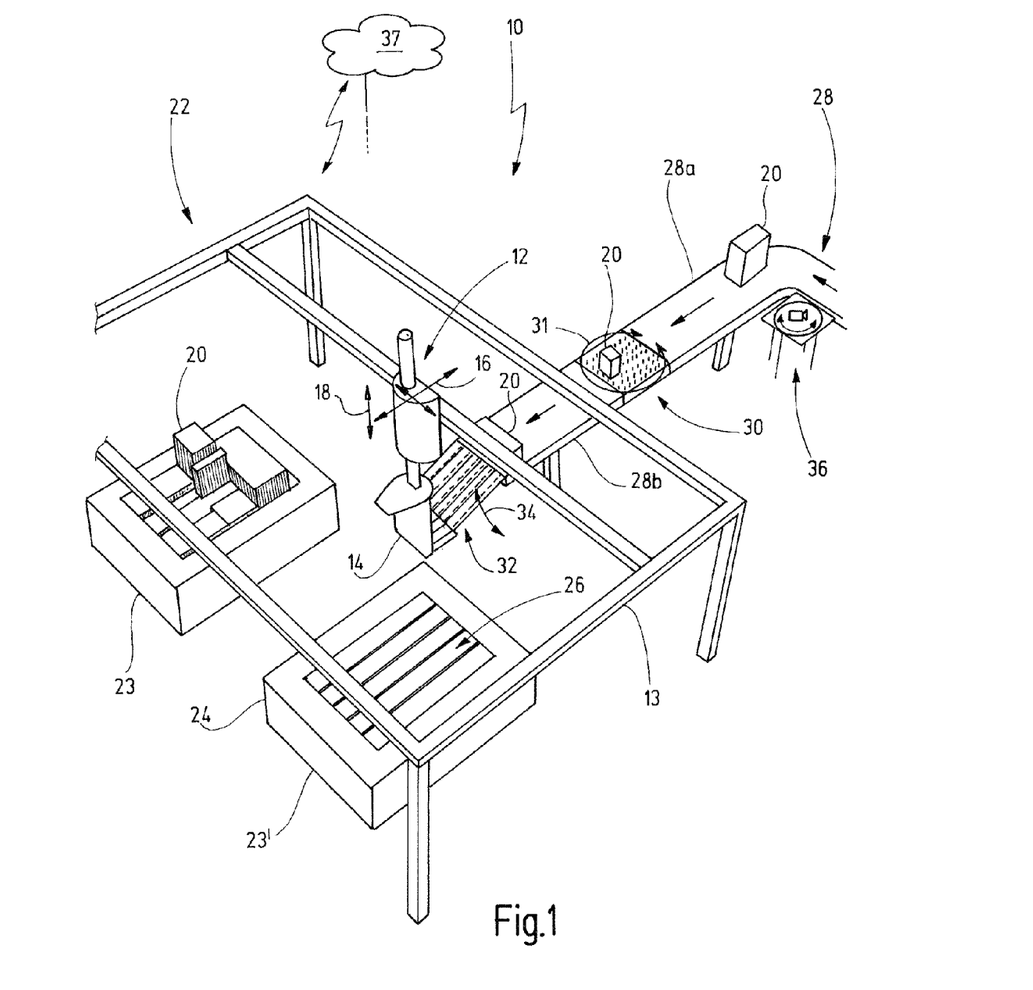
FIG. 1 shows a schematic perspective view of a system in accordance with the present invention.

With reference to FIG. 1 a system is provided for packing articles onto a predetermined position, i.e. on a pre-given standing face on which the article stands when loaded on a shipping carrier.

The system 10 comprises a grab robot 12, which here, for example, is moved on a frame 13 by means of a travel beam not being explained in more detail. The packing robot 12 comprises at a lower end a grab device 14, which particularly is formed rake-like. The packing robot 12 can be moved in a horizontal plane to the front and back as well as to the left and right. This is indicated in FIG. 1 by a cross 16 formed of double arrows. The packing robot 12, or the grab device 14 thereof, can be moved in a vertical direction as well, like it is indicated by a double arrow 18. However, it cannot conduct tilting movements.

Articles 20 are moved to packing places 23, 23' by means of the grab device 14 within a packing station 22 comprising the packing robot 12. The packing places 23, 23' comprise frame-like formation 24 surrounding almost completely a shipping carrier 26 such as a Europool pallet, in order to serve as a stacking aid. The shipping carrier 26 is loaded with articles 20 in a layer-wise manner. As soon as a layer is loaded, the shipping carrier is lowered in a vertical direction about a height of the loaded layer downwards (not illustrated). Other devices beneath a packing plane, such as a wrapping machine, can be provided for e.g. wrapping the stack of articles 20 packed on the shipping carrier 26 with a foil in a supporting manner.

Exemplarily, two packing places 23, 23' are shown in FIG. 1. The provision of a number of packing stations is advantageous for better exploiting the time required to exchange a packed shipping carrier 26. The packing place 23, depicted in the upper left of FIG. 1, is just being processed, i.e. the packing robot 12 loads articles 12 at this packing place 23. The lower packing place 23' contains an empty shipping carrier 26, and can be loaded or packed simultaneously or after completion of the packing process at the first packing place 23.

The articles 20 are transported into the region of the packing station 22 by means of a conveyor 28. The conveyor 28 is divided by a rotating device 30 into a first section 28a located upstream, and a second section 28b located downstream. The transport direction of the articles 20 on the conveyor 28 is indicated by means of black arrows. The conveyor 28, or the lower section 28b, comprises a tilting device 32 at the downstream end thereof. The conveyor 28 can be implemented, for example, by an endlessly rotating belt, or a roller conveyor, etc., which typically are arranged on a hip-high frame.

The articles 20 can be rotated about an arbitrary angle, preferably about a multiple of 90°, by means of the rotating device 30 for rotating about a (not shown) rotating axis, which is substantially orientated perpendicular to a plane of the conveyor 28.

Articles can be tilted from the plane of the conveyor 28, i.e. typically from the horizontal, by means of the tilting station 34 into the vertical, namely about an axis which is preferably orientated parallel to a downstream located end of the conveyor 28. The tilting direction is indicated by a double arrow 34 in FIG. 1.

Further, the system 10 can comprise a monitoring device 36 such as a suitable camera having a corresponding resolution, in order to detect the orientation of the articles 20 with respect to the conveyor 28, if the orientation is not already known in advance. If the relative orientation is detected by means of the monitoring device 36, then this information is transmitted to a superordinated control device 37 such as a warehouse management computer. Data transmission can either happen via a bus system or wirelessly, as indicated in the area of the control device 37 by means of a solid line and a double arrow, respectively.

The control device 37 is also responsible for the operation of the rotating station 30, the tilting station 34 as well as the packing robot 12.

Hereinafter, with reference to FIGS. 2 to 4, a process for rotating and tilting articles is described in more detail.

The region of the conveyor 28 of FIG. 1, which contains the rotating device 30, is illustrated in an isolated manner in FIGS. 2A to 2D.

An article 20 is conveyed downstream towards the rotating station 30 via a first conveyor section 28a, in order to be rotated there to a preselected position (arrow 31), if this is required.

The tilting station 30 comprises a stopper 40 projecting from the plane of the conveyor 28. The stopper 40 serves for stopping the article 20, if the article 20 is delivered to the rotating station 30 from the conveyor section 28a at a certain kinetic energy, and particularly due to inertia. The stopper can be connected to a rotation area 42, or, as an alternative, can be arranged separately relative to the rotation area 42. A separate arrangement is characterized in that the rotation area does not necessarily need to be rotated back after a rotation of a first article has happened, in order to receive a second article to be rotated. In this case, in order to transport off the first article from the rotation area, the stopper is lowered. Subsequently, the stopper is lifted again, but without rotating back the rotation area. Then, the second article can be conveyed on the rotation area.

Here and in the following drawings, one side or face 38 of the body 20 is illustrated dark. The dark illustrated side 38 represents the standing face of the article 20. Later, the article 20 is to be put-down with this face 38 onto the shipping carrier 26 (cf. FIG. 1) by means of the packing robot 12, or the grab device 14 thereof.

Figures 2A, 2B, 2C, 2D:
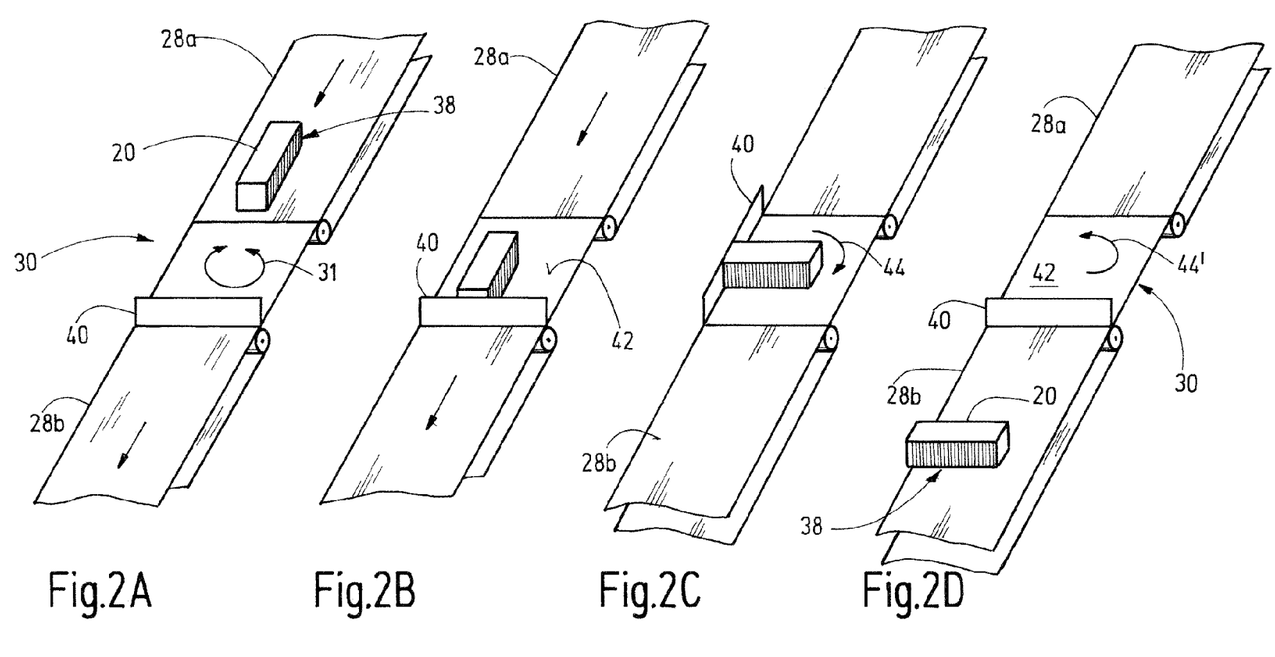
FIG. 2A-2D shows a detailed perspective view of a rotating station at different times.

FIG. 2B shows the situation where the article 20 is located completely on a rotation area 42. The article 20 has been decelerated by the stopper 40.

FIG. 2C shows that the rotating station 30 has been rotated about 90° in a clock-wise manner. The standing face 38 is now orientated towards the end of the second conveyor section 28b being located downstream. It is clear that one can rotate about an arbitrary angle.

In FIG. 2D the article 20 has already been handed over from the rotating station 30 to the conveyor section 28b. For this purpose, the rotating station 30 preferably comprises a separate conveyor (not illustrated) allowing to hand over the article.

Figures 3A, 3B, 3C:
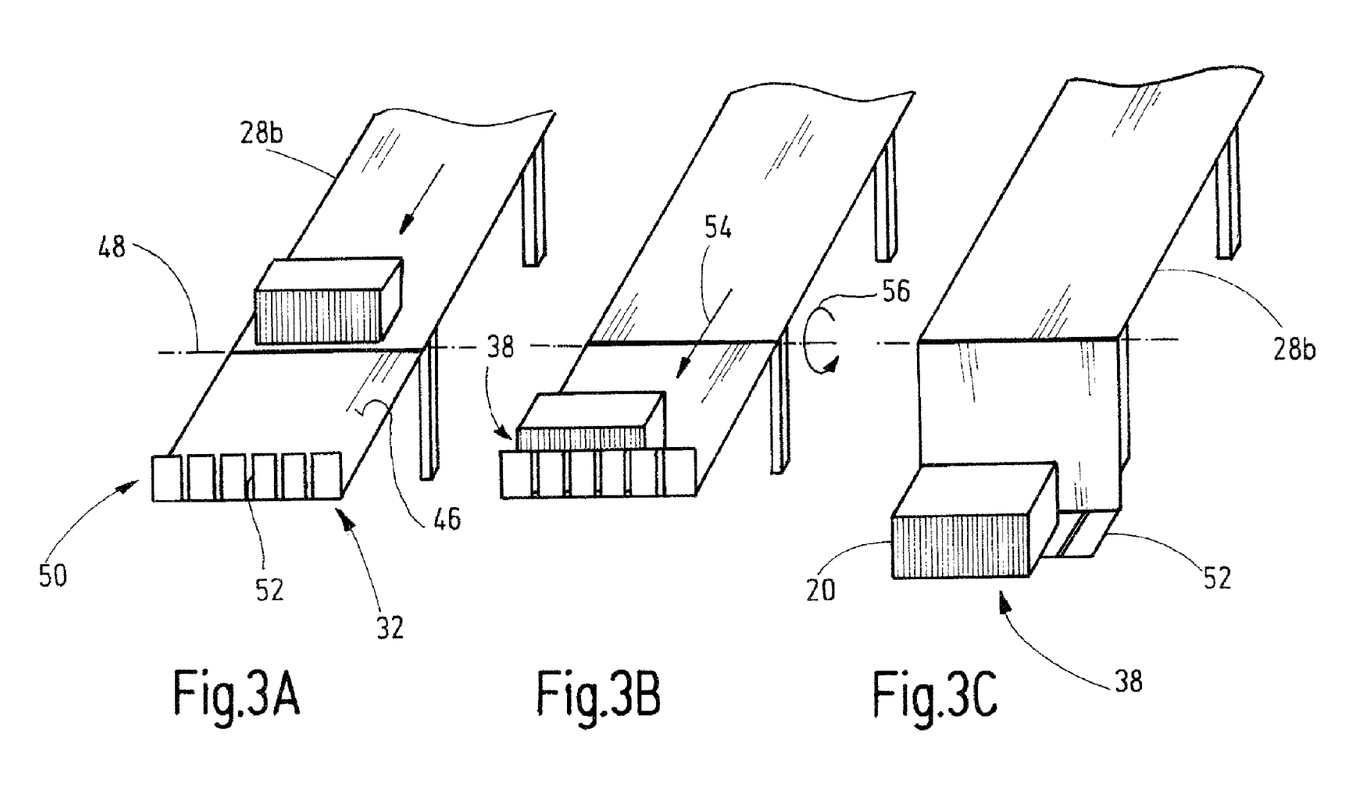
FIG. 3A-3C shows a detailed perspective view of a tilting station at different times.

With reference to FIGS. 3A to 3C a tilting process will be described.

FIG. 3A follows to FIG. 2D and shows a situation in which the article 20 of FIG. 2 has been transported to a downstream located end of the conveyor section 28b. There, the tilting station 32 is arranged.

The tilting station 32 comprises a tilt area 46, which is here illustrated schematically, pivotably supported about a tilting axis 48 on the conveyor section 28b at the upstream located end thereof. A stopper 50 comprising a plurality of, for example, rake-like arranged spikes 52 is in turn provided at an end of the tilt area 46 located downstream.

FIG. 3B shows the situation in which the article 20 has already been delivered to the tilting station 32.

The standing face 38 of the article 20 abuts against the stopper 50. For this purpose, the tilting station 32 does not necessarily need to comprise a specific conveyor, such as driven rollers or belts. If the kinetic energy of the article 20 is sufficiently high when the article comes in from the conveyor 28b, then the article 20 can slide, without additional energy input, up to the stopper 50 located downstream. In this connection, it is advantageous if the surface of the tilt area 46 is provided with a substance, which comprises a correspondingly low friction coefficient. In FIGS. 3A and 3B, the tilting station 32 is shown in the receiving position thereof. In this connection, the tilt area 46 is preferably arranged parallel relative to the plane of the conveyor section 28b, i.e. the tilt area 46 and the conveyor section 28b substantially lie in the same plane. However, the tilt area 46 could be tilted slightly towards the vertical in order to support the movement of an article 20 during the handing over from the conveyor section 28b due to gravity. The tilt area 46 could be provided, for example, with slide rollers.

As soon as the article 20 has been handed over from the conveyor section 28b to the tilting station 32 (schematically indicated by an arrow 54), the tilt area 46 can be rotated about the tilting axis 48 thereof, as schematically indicated by an arrow 56.

It is clear that optionally lateral orientating devices can be provided as well, in order to orientate the article 20 with respect to the left edge or right edge of the conveyor 28.

FIG. 3C shows the situation in which the tilting device 32 has been moved into the tilting position thereof.

In the tilting position, the tilt area 46 is almost completely in the vertical. The standing face 38 cannot be seen any more in FIG. 3C. The article 20 stands on the spikes 52 on the standing face 38 thereof. Thus, the article 20 is ready for being retrieved by the packing robot 12. Preferably, the packing robot 12 is then already in the receiving position thereof so that the article 20 cannot drop from the tilt area 46. This can make it necessary that the robot 12 moves synchronous relative to the tilting station 32, wherein the stopper 50 of the tilt area 46 meshes with the grab device 14.

However, if the area 46 is tilted upwards, as it will be described in more detail hereinafter, it is sufficient that the robot 12 waits in its receiving position.

With reference to the FIGS. 4A to 4E a retrieval process will be explained hereinafter. In FIGS. 4A to 4E the conveyor section 28b as well as the tilting station 32 and the packing robot 12 are illustrated in schematic side views. In this connection, FIG. 4A corresponds to the illustration of FIG. 3B. FIG. 4B corresponds to FIG. 3C.

Figure 4A:
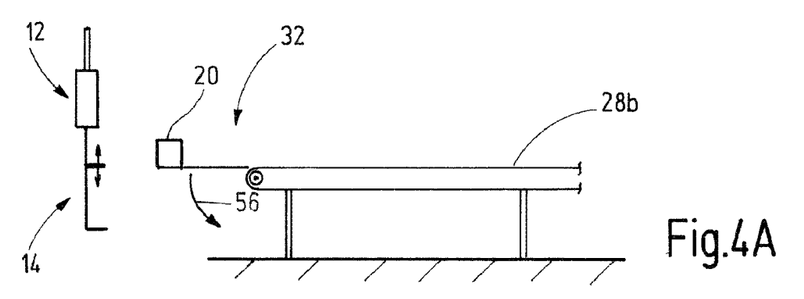
FIG. 4A-4E shows side views of the tilting station of FIG. 3 cooperating with a packing robot.
Figure 4B:
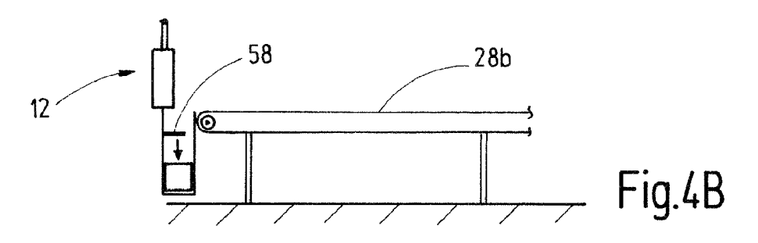

FIGS. 4A and 4B additionally show the packing robot 12 and the motion thereof relative to the tilting device 32. The packing robot 12, i.e. the grab device 14 thereof, comprises a fixing element 58 displaceable in height.

The grab device 14 comprises a cross section being substantially L-shaped, and is formed corresponding to the shape of the stopper 50 so that they reach into the hollow spaces between the spikes 52 of the stopper 50 of the tilting station 32.

As soon as the grab device 14 travels (cf. FIG. 4B) into the recess between the spikes 52 (cf. FIG. 3A), the fixing element 58 is lowered for clamping the article 20.

Figure 4C:
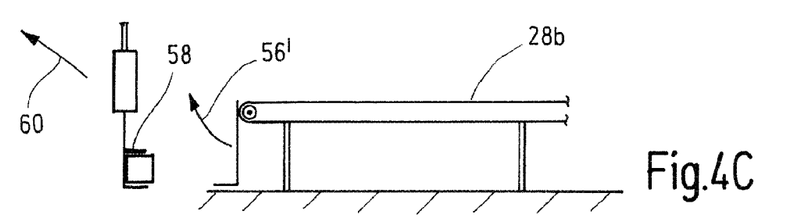

Then, the packing robot 12 can be moved away towards the packing stations 23, 23'. In FIG. 4C, this is schematically indicated by an arrow 60.

Subsequently or simultaneously, the tilting station can already be tilted back from the tilting position thereof into the receiving position, as indicated by an arrow 56'.

If it is required that the article 20 has to be tilted again, before it can be transported to the shipping carrier 26, then this additional tilting process could happen by a cooperation of the packing robot 12 and the tilting station 32. This is hereinafter shown in FIGS. 4D and 4E.

Figure 4D:
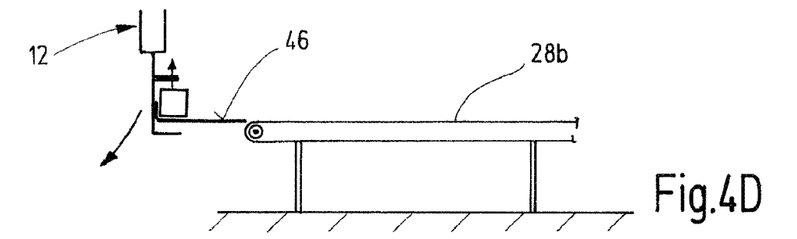
Figure 4E:
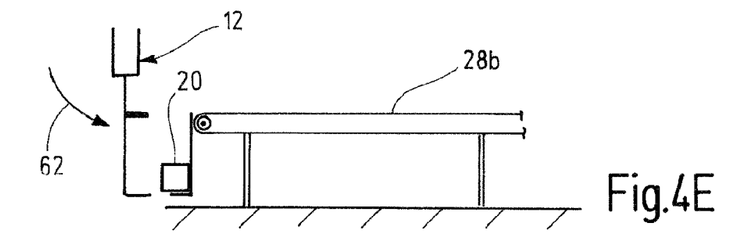

Once again, tilting can be necessary, for example, if the article 20 is originally conveyed on the head thereof across the conveyor 28 to the rotating station 30 or the tilting station 32. Then, the article has to be tilted twice about 90°.

As shown in FIG. 4D, the grabbed article 20 (cf. FIG. 4C) can be delivered once again from the packing robot 12 to the tilt area 46 of the tilting station 32. For this purpose, the tilt area 46 can also be formed, for example, like a rake, i.e. the tilt area 46 comprises recesses allowing the grab device 14 of the packing robot 12 to reach therethrough and to deliver the article 20 to the tilting station 32 again. It is clear that the fixing element 58 has to be moved correspondingly for this purpose.

As soon as the article 20 has been put again on the tilt area 46, the above-explained tilting process can be performed again, in order to tilt the article 20 once again. A repetition of the description of the repeated tilting process is omitted here, since the process happens in an identical manner with respect to the one as already described.

Figures 5A, 5B, 5C:
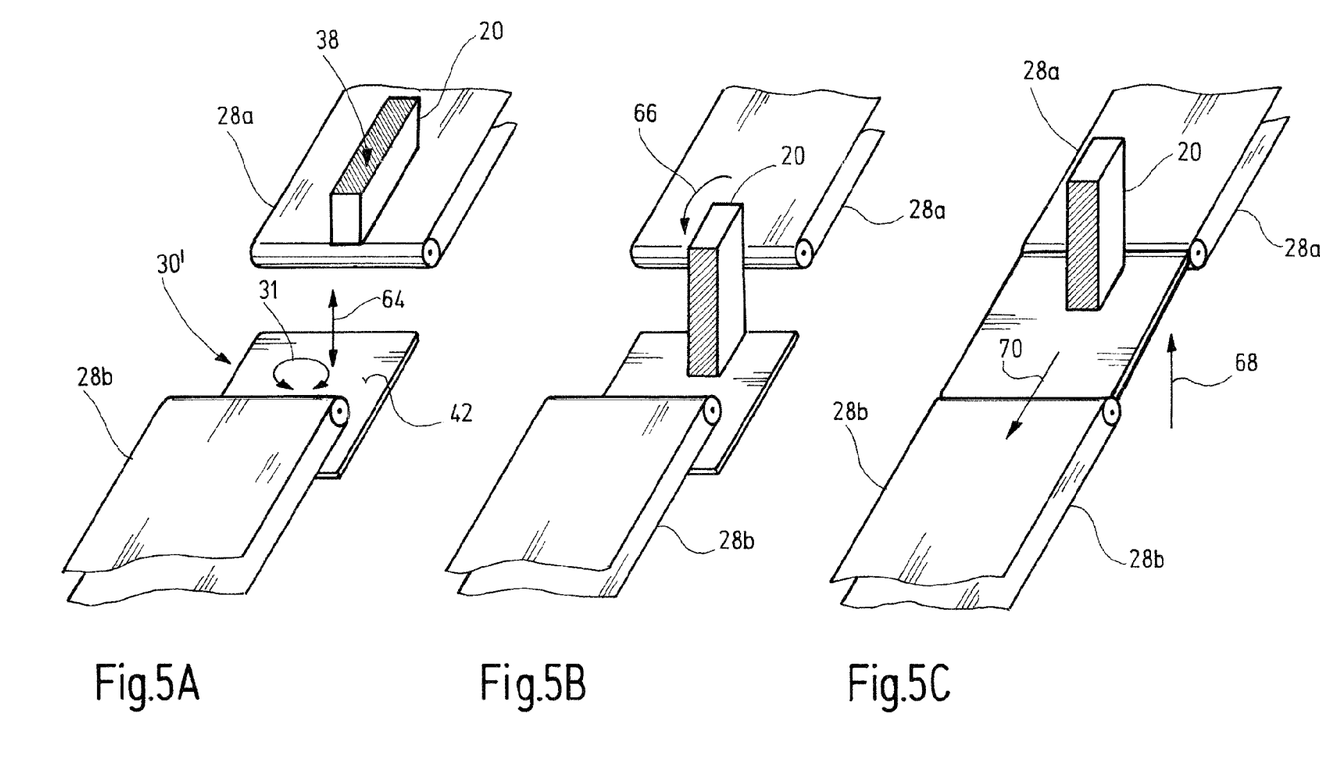
FIG. 5A-5C shows another embodiment of the rotating station of FIG. 2 at different times.

Another alternative for tilting an article 20 once again is shown in FIGS. 5A to 5C.

FIGS. 5A to 5C illustrate a rotating station 30' similar to the one of FIG. 2, wherein the rotating station 30' additionally has the capability to be lifted and lowered, which is indicated by a double arrow 64.

With reference to FIG. 5A an article 20 is delivered "standing on its head". The rotation area 42 can already be lowered slightly relative to the conveyor 28a. The conveyor 28a conveys the article 20 over its end located downstream so that the article 20 tilts towards the already lowered rotation area 42.

It is clear that the tilting movement of the article 20 can be synchronized with the lowering movement of the rotation area 42, in order to prevent that the article 20 drops on the rotation area 42. The body 20 can be caught by the rotation area 42 and accompanied to the bottom.

In this context, it is advantageous if a light barrier is arranged in the downstream located region of the conveyor section 28a so it can be detected when the article 20 passes the downstream end of the conveyor section 28a. Also, it is advantageous if the length of the article 20 along the longitudinal axis of the conveyor section 28a has been determined beforehand. Thereby, an information is present on how deep the rotating station 30 has to be lowered for at least tilting the article 20, as indicated in FIG. 5B by an arrow 66.

Subsequently, the rotation area 42 is lifted again to the level of the conveyor sections 28a and 28b, as indicated by an arrow 68 in FIG. 5C. Then, the article 20 can additionally be rotated (cf. arrow 31 in FIG. 5A) or can be delivered directly to the conveyor section 28b, as schematically indicated by an arrow 70 in FIG. 5C.

Figure 6:
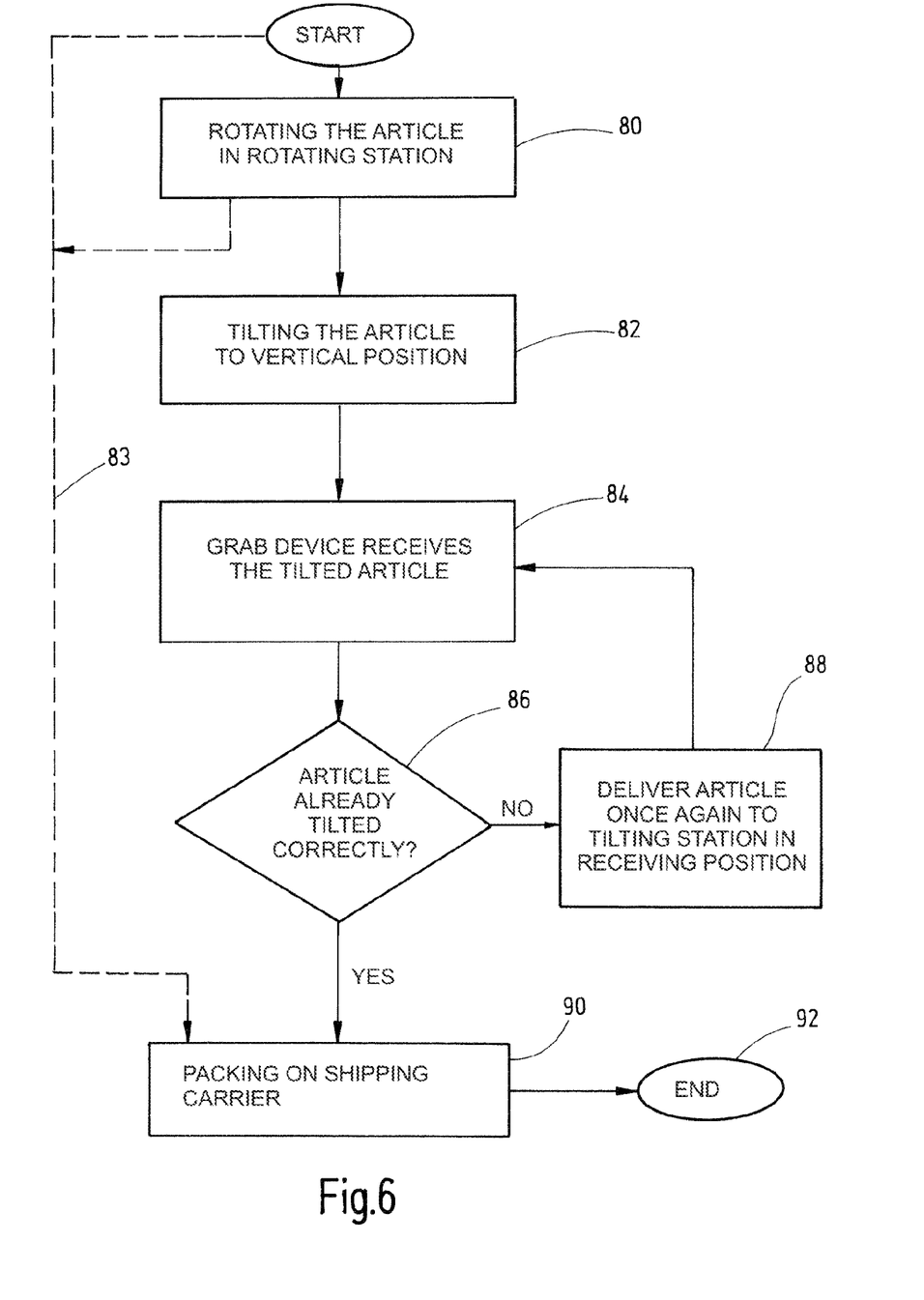
FIG. 6 shows a schematic flow chart of a method in accordance with the present invention.

With reference to FIG. 6 the method in accordance with the present invention is schematically illustrated in terms of a flow chart.

Correspondingly, the articles 20 on the rotation area 42 of the rotating station 32 are rotated about a rotating axis into a desired angle position, wherein the rotating axis is orientated perpendicular with respect to the plane of the conveyor 28 (block 80).

The rotated articles 20 are subsequently tilted by delivering them from the conveyor 28 onto the tilt area 46 of the tilting station 32 (block 82). In this connection, the tilt area substantially is in a horizontal receiving position, and then rotated about the tilting axis 48, which lies in the plane of the conveyor 28, in a substantially vertical tilting position.

If the article 20 has to be neither tilted nor rotated, in order to be packed, the article 20 can pass the corresponding stations 30 and 32, respectively, also without any action (cf. dotted line 83).

The grab device 14 of the packing robot 12 takes the tilted article 20 (block 84).

Optionally, it can be checked whether the article is already in the "right" tilting position thereof (block 86). If the article 20 is not yet in the right position, then it can be delivered to the tilting station 32 once again, the tilt area 46 thereof has been tilted into the receiving position again beforehand (block 88).

If the article is already in the right tilted position, then the article can be loaded by the grab device 14 of the packing robot 12 onto the shipping carrier 26 (block 90).

The packing process is then completed (block 92).

It is clear that the packing robot in case of a failure can be replaced by a human, also in short-time terms. For preventing a human from entering the operational area unintentionally corresponding light grids can be mounted around the robot cell.

As an alternative to the above-mentioned tilting of the tilt area 46 from the horizontal "downwards" to the vertical, the tilt area could also be formed such that the tilt area is tilted upwards to the vertical. In this case, the tilting axis is at the downstream located end of the tilt area. The upstream located end of the tilt area adjacent to the conveyor can be moved freely. Thus, it is possible that the grab device 14 of the packing robot 12 can already be moved in the receiving position thereof until the article is tilted upwards. In the receiving position, the grab device is adjacent to the tilting station so that the article can be received directly from the tilting position. Thereby, the packing time is significantly shortened. The packing robot does not need to wait for the tilting station, in order to allow a movement towards the receiving position.

Another advantage of the upward tilting is to be seen in that the articles cannot fall from the tilt area, since the tilt area acts as a support.

Independent from "tilting down" or "tilting up", the tilting station 32 can comprise, preferably single, driven rollers being arranged in the plane of the tilt area. By means of these rollers articles can be orientated again, if, for example during the transport from the rotating station 30 to the tilting station 32, the article has happened to be twisted or slipped-off. Such an array of rollers is described in the German patent application DE 10 2006 039 697 (filing date 21 Aug. 2006).

Such an array of rollers can be provided optionally also at the rotating station 30.

It is clear that conveyor sections 28a and 28b represent conveyors which have been put together in order to form a conveyor line.

Therefore, we claim:

1. A system for packing articles onto a shipping carrier, the articles having an arbitrary orientation relative to a conveyor and being transported within an order-picking system downstream on the conveyor towards a packing station, which comprises a packing robot for automatically loading the shipping carrier, wherein each of the articles is to be put down onto the shipping carrier with one of its faces, the one of the faces can be predetermined arbitrarily, the system comprising:
   a rotating station having a rotation area, which is substantially arranged in a plane of the conveyor for receiving an article from the conveyor, and is rotatable from a receiving position about an axis, perpendicular to the plane of the conveyor, to a plurality of delivery positions; and
   a tilting station comprising a tilt area, wherein the tilt area in a receiving position is substantially orientated parallel with respect to the plane of the conveyor, and in a tilting position is substantially orientated perpendicular to the plane of the conveyor;
   wherein the tilt area comprises a stopper at a downstream located end against which articles abut, which are handed over from the conveyor to the tilting station, and which is suitable to support the handed-over article in the tilting position;
   wherein the packing robot comprises a grab device; and
   wherein at least the stopper comprises at least one recess such that the grab device, if the tilt area is in the tilting position, can reach beneath the handed-over article for taking over same by lifting the grab device.

2. The System of claim 1, wherein the rotating station is provided in a course of the conveyor, and thus divides the conveyor.

3. The system of claim 1, wherein the tilt area comprises, at an upstream located end of the tilt area, a tilting axis, which is orientated parallel relative to a downstream located handing-over end of the conveyor.

4. The system of claim 3, wherein the tilting axis follows the handing-over end of the conveyor.

5. The system of claim 1, wherein the tilt area comprises at least one recess being adapted to the grab device.

6. The system of claim 1, wherein the at least one recess meshes with the grab device.

7. The system of claim 1, wherein the tilting station comprises a lifting and lowering device, in order to reciprocate the tilt area between the receiving position and the tilting position.

8. The system of claim 7, wherein the lifting and lowering device is an electrically or hydraulically operated cylinder.

9. The system of claim 1, wherein the rotating station comprises a stopper at a downstream located end thereof.

10. The system of claim 9, wherein the stopper of the rotating station is adapted to be lowered relative to the tilt area.

11. The system of claim 1, wherein the rotation area is adapted to be lifted and lowered relative to the plane of the conveyor.

12. The system of claim 1, wherein the rotating station comprises a convey- or for handing over an article located on the rotation area, after a rotation process has been performed, towards a section of the conveyor being located downstream.

13. The system of claim 1, wherein the rotating station and the tilting station are arranged separately from each other.

14. A system for packing articles onto a shipping carrier, the articles having an arbitrary orientation relative to a conveyor and being transported within an order-picking system downstream on the conveyor towards a packing station, which comprises a packing robot for automatically loading the shipping carrier, wherein each of the articles is to be put down onto the shipping carrier with one of its faces, the one of the faces can be predetermined arbitrarily, the system comprising:
   a rotating station having a rotation area, which is substantially arranged in a plane of the conveyor for receiving an article from the conveyor, and is rotatable from a receiving position about an axis, perpendicular to the plane of the conveyor, to a plurality of delivery positions;
   a tilting station comprising a tilt area, wherein the tilt area in a receiving position is substantially orientated parallel with respect to the plane of the conveyor, and in a tilting position is substantially orientated perpendicular to the plane of the conveyor; and
   a monitoring device arranged upstream relative to the rotating station for detecting a position of an article to be packed on the conveyor, and transmitting to a superordinated control device which is suitable to calculate a rotating and tilting process, in order to pack the article on its predefined standing face on the shipping carrier.

15. The system of claim 14, wherein the superordinated control device is a warehouse management computer.

16. The system of claim 14, wherein the tilt area comprises a stopper at a downstream located end against which articles abut, which are handed over from the conveyor to the tilting station, and which is suitable to support the handed-over article in the tilting position.

17. The system of claim 16, wherein at least the stopper comprises at least one recess such that a grab device of the packing robot, if the tilt area is in the tilting position, can reach beneath the handed-over article for taking over same by lifting the grab device.

18. The system of claim 16, wherein the tilt area comprises at least one recess being adapted to the grab device; and wherein the at least one recess meshes with the grab device.

19. The system of claim 14, wherein the rotating station comprises a stopper at a downstream located end thereof; wherein the stopper of the rotating station is adapted to be lowered relative to the tilt area; and wherein the rotation area is adapted to be lifted and lowered relative to the plane of the conveyor.

20. A method for packing an article on a shipping carrier, the article having an arbitrary orientation relative to a conveyor and being transported within an order-picking system on the conveyor downstream towards a packing station, which comprises a packing robot for automatically loading the article on the shipping carrier, wherein the article is to be put down on the shipping carrier with one of its faces, wherein the one face can be predetermined arbitrarily, comprising the steps of:
   rotating the article on a rotation area of the rotating station about a rotating axis orientated perpendicularly to a plane of the conveyor;

tilting the rotated article on a tilt area from a substantially horizontal receiving position about a tilting axis being in the plane of the conveyor into a substantially vertical tilting position;

receiving the tilted article by means of the packing robot; wherein the step of receiving comprises:

reaching beneath a stopper of the tilt area, which at least comprises a recess, by means of a grab device of the packing robot meshing with the recess; and lifting the grab device for taking over the article and putting down on the shipping carrier; and putting-down the article with a predefined standing face thereof on the shipping carrier.

\* \* \* \* \*